(12) United States Patent
Williamson

(10) Patent No.: US 10,149,251 B2
(45) Date of Patent: *Dec. 4, 2018

(54) POWER ALLOCATION IN DISTRIBUTED ANTENNA SYSTEMS BASED ON KEY PERFORMANCE INDICATORS

(71) Applicant: CommScope Technologies LLC, Hickory, NC (US)

(72) Inventor: Michael J. Williamson, Clayton, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/592,641

(22) Filed: May 11, 2017

(65) Prior Publication Data
US 2018/0092044 A1 Mar. 29, 2018

Related U.S. Application Data

(63) Continuation of application No. 14/655,529, filed as application No. PCT/US2015/013221 on Jan. 28, 2015, now Pat. No. 9,681,396.

(60) Provisional application No. 61/933,751, filed on Jan. 30, 2014.

(51) Int. Cl.
| | |
|---|---|
| *H04W 52/24* | (2009.01) |
| *H04W 52/42* | (2009.01) |
| *H04W 72/08* | (2009.01) |
| *H04W 52/14* | (2009.01) |

(Continued)

(52) U.S. Cl.
CPC .......... *H04W 52/242* (2013.01); *H04B 7/022* (2013.01); *H04W 52/143* (2013.01); *H04W 52/245* (2013.01); *H04W 52/42* (2013.01); *H04W 72/085* (2013.01); *H04W 88/02* (2013.01)

(58) Field of Classification Search
CPC ..... H04W 76/02; H04W 8/30; G06F 11/1438; H04L 67/1097
See application file for complete search history.

(56) References Cited

U.S. PATENT DOCUMENTS

| | | |
|---|---|---|
| 5,668,562 A | 9/1997 | Cutrer et al. |
| 6,373,823 B1 | 4/2002 | Chen et al. |
| 7,308,042 B2 | 12/2007 | Jin et al. |

(Continued)

FOREIGN PATENT DOCUMENTS

| | | |
|---|---|---|
| KR | 1020090088086 | 8/2009 |
| WO | 2013166002 | 11/2013 |

OTHER PUBLICATIONS

U.S. Patent Office, "Final Office Action", "from U.S. Appl. No. 14/655,529", dated Nov. 14, 2016, pp. 1-19, Published in: US.

(Continued)

*Primary Examiner* — Shailendra Kumar
(74) *Attorney, Agent, or Firm* — Fogg & Powers LLC

(57) ABSTRACT

Certain aspects involve distributing power in a distributed antenna system. A subsystem of the distributed antenna system can receive key performance indicators for remote units and system factors that affect the key performance indicators. The subsystem can determine a radio frequency power to achieve key performance indicators based on the one or more system factors and configure the remote units to operate at the radio frequency power.

11 Claims, 4 Drawing Sheets

(51) Int. Cl.
*H04W 88/02* (2009.01)
*H04B 7/022* (2017.01)

(56) References Cited

U.S. PATENT DOCUMENTS

| | | |
|---|---|---|
| 8,175,649 B2 | 5/2012 | Saban et al. |
| 8,472,409 B2 | 6/2013 | Sun et al. |
| 8,532,580 B2 | 9/2013 | Elliott et al. |
| 8,611,916 B2 | 12/2013 | Gao |
| 8,682,338 B2 | 3/2014 | Lemson et al. |
| 2011/0222434 A1 | 9/2011 | Chen |
| 2011/0223958 A1 | 9/2011 | Chen et al. |
| 2011/0244914 A1 | 10/2011 | Venkatraman et al. |
| 2012/0100847 A1* | 4/2012 | Rahman ............... H04W 24/08 455/424 |
| 2012/0196611 A1* | 8/2012 | Venkatraman ...... H04W 52/143 455/450 |
| 2012/0308238 A1 | 12/2012 | Shida |
| 2013/0040676 A1 | 2/2013 | Kang et al. |
| 2013/0095871 A1 | 4/2013 | Soriaga et al. |
| 2013/0095875 A1 | 4/2013 | Reuven |
| 2013/0150065 A1 | 6/2013 | Elliot et al. |
| 2013/0295980 A1 | 11/2013 | Reuven et al. |
| 2013/0308537 A1 | 11/2013 | Kummetz et al. |
| 2014/0010548 A1 | 1/2014 | Berlin et al. |
| 2014/0024402 A1* | 1/2014 | Singh ..................... H04B 17/23 455/501 |
| 2014/0050483 A1* | 2/2014 | Berlin .................. H04B 7/2606 398/115 |
| 2014/0066115 A1 | 3/2014 | Sanders |
| 2014/0079037 A1 | 3/2014 | Evans et al. |
| 2014/0087742 A1 | 3/2014 | Brower et al. |
| 2014/0233442 A1 | 8/2014 | Atias et al. |

OTHER PUBLICATIONS

U.S. Patent Office, "Notice of Allowance", "from U.S. Appl. No. 14/655,529", dated Feb. 8, 2017, pp. 1-15, Published in: US.

U.S. Patent Office, "Office Action", "from U.S. Appl. No. 14/655,529", dated Jul. 21, 2016, pp. 1-23, Published in: US.

International Search Authority, "International Search Report and Written Opinion for PCT Application No. PCT/US2015/013221", dated Apr. 21, 2015, pp. 1-14, Published in: WO.

European Patent Office, "Extended European Search Report for EP Application No. 15743342.6", "Foreign Counterpart to U.S. Appl. No. 14/655,529", dated Jul. 21, 2017, pp. 1-7, Published in: EP.

* cited by examiner

POWER ALLOCATION IN DISTRIBUTED ANTENNA SYSTEMS BASED ON KEY PERFORMANCE INDICATORS

CROSS-REFERENCE TO RELATED APPLICATION

This application is a continuation of U.S. patent application Ser. No. 14/655,529, filed Jun. 25, 2015 and titled "POWER ALLOCATION IN DISTRIBUTED ANTENNA SYSTEMS BASED ON KEY PERFORMANCE INDICATORS", which is a U.S. national phase under 35 U.S.C. 371 of International Patent Application No. PCT/US2015/013221, filed Jan. 28, 2015 and titled "POWER ALLOCATION IN DISTRIBUTED ANTENNA SYSTEMS BASED ON KEY PERFORMANCE INDICATORS", which claims the benefit of an priority to U.S. Provisional Application Ser. No. 61/933,751, filed Jan. 30, 2014 and titled "METHODS AND SYSTEMS FOR DISTRIBUTING POWER TO DIFFERENT ARCHITECTURES BASED ON KEY PERFORMANCE INDICATORS" the contents of each of which are incorporated herein by reference.

TECHNICAL FIELD

The present disclosure generally relates to telecommunications systems and more particularly (though not necessarily exclusively) to allocating power in a distributed antenna system based on key performance indicators for the distributed antenna system.

BACKGROUND

A distributed antenna system ("DAS") can include one or more head-end units and multiple remote units communicatively coupled to each head-end unit. Head-end units can be communicatively coupled to base stations. A DAS can be used to extend wireless coverage in an area. A head-end unit can receive downlink signals from a base station and distribute downlink signals as broadband signals in an analog or digital format to a radio frequency ("RF") distribution system, which can include one or more remote units. The remote units can transmit the downlink signals to user equipment ("UE") within coverage zones serviced by the remote units.

In some DAS configurations, the RF power output to the remote units is set to the same level for all carriers in the DAS or for each carrier frequency band. To provide RF power for different frequency bands, the DAS is configured such that an RF power amplifier is designated for each frequency band. This configuration, however, may result in wasted energy in the DAS. It may therefore be desirable to allocate power in a DAS more efficiently.

SUMMARY

Systems and methods are disclosed for allocating power to a distributed antenna system based on key performance indicators.

According to one aspect of the present disclosure, key performance indicators ("KPIs") and system factors are received. RF power for the remote unit to achieve the KPIs is determined based in part on the system factors. The remote unit is configured to operate at the determined RF power.

According to another aspect of the disclosure, a power allocation subsystem in a DAS includes a processor and a power allocation module. The processor can receive KPIs and system factors. The power allocation module can instruct the processor to receive the KPIs and system factors, to determine an RF power for a remote unit to achieve the KPIs based in part on the system factors, and to configure the remote unit to operate at the determined RF power.

According to another aspect of the disclosure, a DAS includes a remote unit connected to a head-end unit. The head-end unit includes a receiver, a power allocation subsystem, and a transmitter. The receiver can receive KPIs and system factors. The power allocation subsystem can be configured to receive the KPIs and system factors, determine an RF power for the remote units to achieve the KPIs based on the system factors, and configure the remote unit to operate at the determined RF power. The transmitter can transmit information representing the RF power to the remote unit.

DETAILED DESCRIPTION

According to the subject matter described herein, RF power allocation and distribution in a distributed antenna system ("DAS") can be optimized using intelligent allocation of RF power among different telecommunication providers spanning multiple frequency bands. For example, RF power distribution can be allocated using key performance indicators ("KPIs") for remote units of the DAS. A KPI can represent a level of performance by the remote units that can achieve one or more coverage objectives for the remote units. The DAS may be configured to provide an RF signal at a level sufficient to meet specified KPIs for one or more remote units of the DAS. The KPIs can influence the quality of the signal through voice quality or data transmission rates. RF power allocation can be optimized by configuring remote units with RF power levels that are sufficient for obtaining the coverage objectives for the remote units. Optimization of RF power allocation can provide better use of the existing RF power amplifier resources, which may influence the power consumption, heat dissipation, and cost of a DAS system, particularly in DAS systems where multiple frequency bands share a common amplifier and RF power is limited.

In certain aspects, a KPI can be a signal strength that allows a remote unit in a coverage zone to communicate with user equipment ("UE") at a given data speed. Certain system factors, or measurements of the distributed antenna system that affect performance of the remote unit at the desired KPI level based on the configuration of the DAS, may affect the signal strength (or other specified KPI) and thereby lower the data speed associated with the remote unit. A power allocation subsystem of the DAS can identify, determine, or otherwise obtain system factors for the DAS to allocate RF power to the remote units such that the remote units can meet their respective coverage objectives in light of the system factors. For example, the power allocation subsystem can allocate sufficient RF power among the remote units to compensate for one or more identified system factors. Allocating power among different frequency modulation types in different frequency bands in a manner that accounts for system factors can optimize a finite RF power available from a power amplifier. In some aspects, RF power may be allocated based on common or different carrier frequency modulations. System factors can include, though are not limited to, coaxial cable loss, path loss, DAS antenna gain, reference power associated with the carrier signal format (e.g., LTE, GSM, UMTS), and base station transmit power. One or more of these system factors can be a function of a frequency of the carrier signal.

Figure 1:
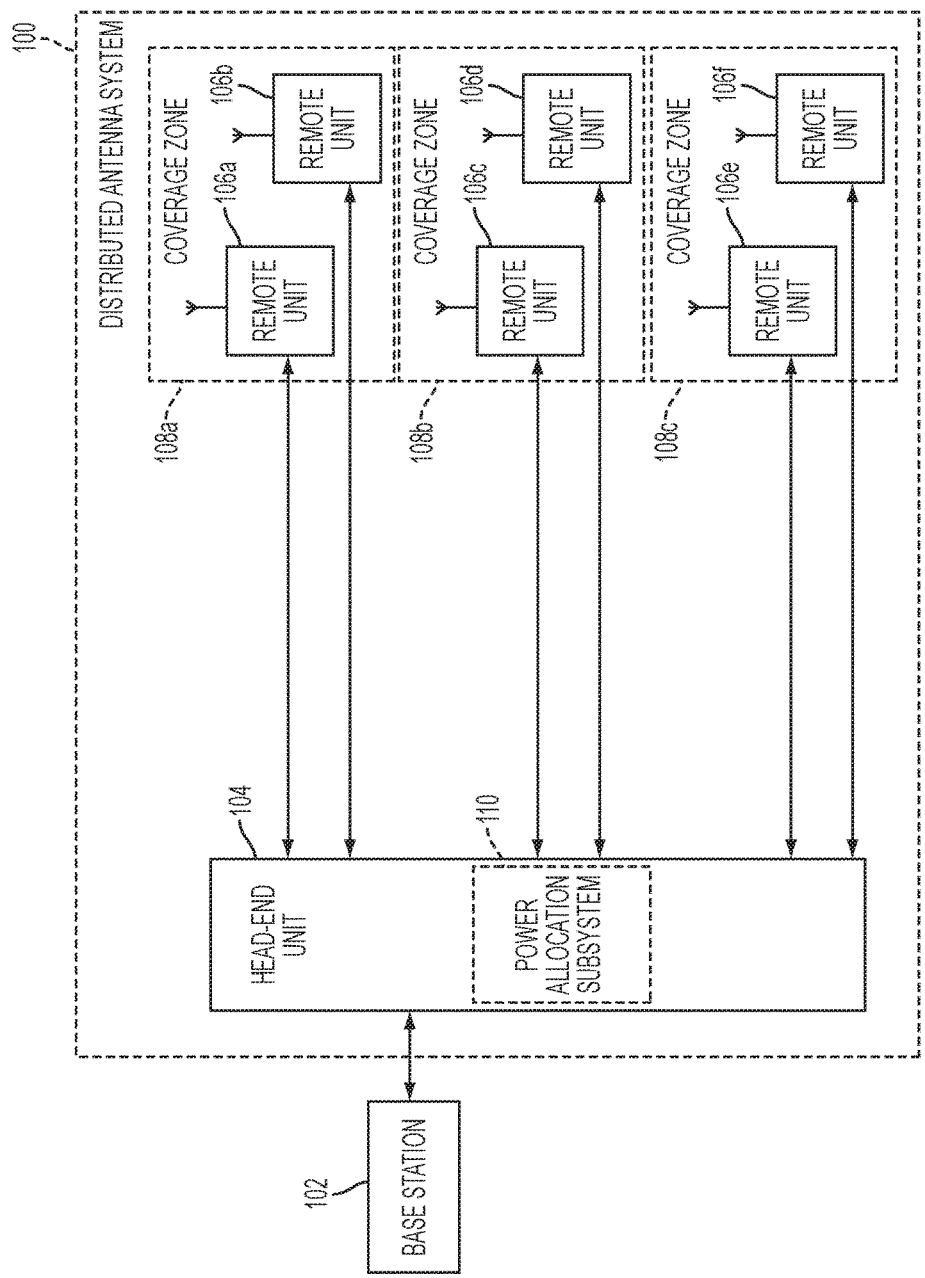
FIG. 1 is block diagram depicting a telecommunications system according to an aspect of the present disclosure.

FIG. 1 depicts an example of a DAS 100 suitable for optimizing power distribution based on KPIs according to an aspect. The DAS 100 can be communicative coupled to a base station 102. Any suitable communication link can be used for communicative coupling the base station 102 and the DAS 100, including, though not limited to, a direct connection such as a copper, optical fiber, or other suitable cable or communication medium, or a wireless connection.

The base station 102 can be communicatively coupled to the DAS 100 via one or more head-end units 104 that can transmit uplink and downlink signals between the base station 102 and the DAS 100. Examples of head-end units include master units, base station routers, or other devices in a DAS that are configured for communicating signals between base stations and remote units. In FIG. 1, the DAS 100 includes one head-end unit 104 that can be communicatively coupled to remote units 106a-f, although any number of head-end units 104 can be used in a DAS 100. Although FIG. 1 depicts a direct connection between the head-end unit 104 and the remote units 106a-f, other implementations are possible. In some aspects, the head-end unit 104 can be communicatively coupled to the remote units 106a-f via one or more extension units or other intermediate devices. Also, while FIG. 1 depicts six remote units 106a-f, the DAS 100 can include any number of remote units.

The communicative coupling between the head-end unit 104 and the remote units 106a-f allows for the DAS 100 to service UEs in the respective coverage zones 108a-c of the remote units 106a-f. For example, remote units 106a and 106b can provide signal coverage for coverage zone 108a, remote units 106c and 106d can provide signal coverage for coverage zone 108b, and remote units 106e and 106f can provide signal coverage for coverage zone 108c. The remote units 106a-f can include transceiving devices that can include or be communicatively coupled to one or more antennas.

The DAS 100 can also include a power allocation subsystem 110 that can allocate RF power information to the remote units 106a-f according to the KPI for each remote unit 106a-f. In FIG. 1, the power allocation subsystem 110 is located in the head-end unit 104 of the DAS 100. However, the power allocation subsystem 110 can be located anywhere in the DAS 100 without departing from the scope of the present disclosure. In some aspects, components of the power allocation subsystem 110 can be included in multiple devices in the DAS 100. In additional or alternative aspects, the power allocation subsystem 110 can be a dedicated device separate from and communicatively coupled to one or more of the head-end unit 104 and the remote units 106a-c.

Figure 2:
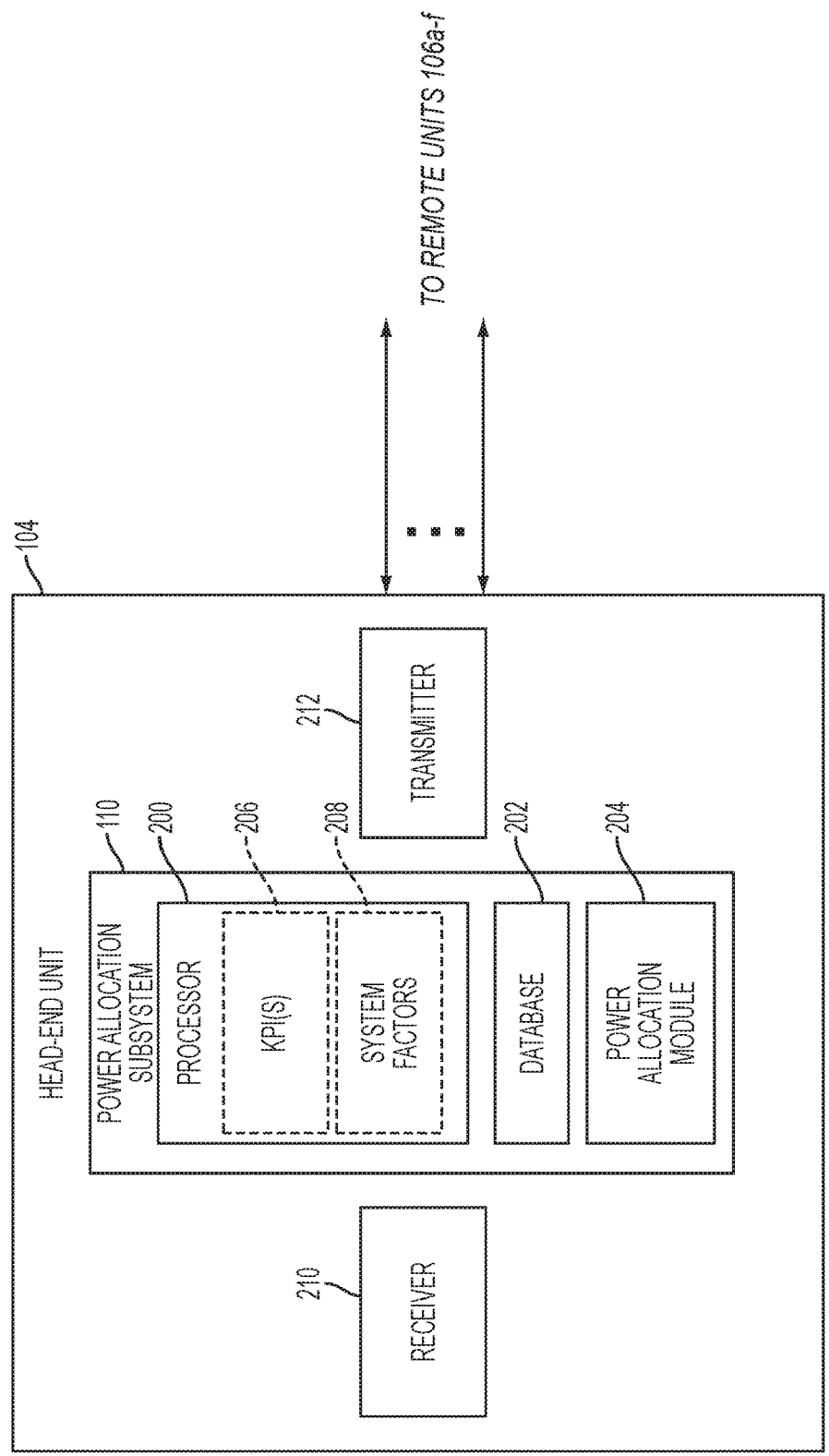
FIG. 2 is a flow chart depicting a process for allocating power in a telecommunications system according to an aspect of the present disclosure.

FIG. 2 illustrates a power allocation subsystem 110 located in the head-end unit 104 and designed to allocate RF power to the remote units 106a-f in a DAS 100. The power allocation subsystem 110 can include at least a memory device such as one non-transitory computer-readable medium. The power allocation subsystem 110 can also include instructions stored in the memory device executable by a processing device to allocate the RF power to the remote units 106a-f. In FIG. 2, the power allocation subsystem 110 includes a processor 200, a database 202, and a power allocation module 204. Examples of the processor 200 include a microprocessor, an application-specific integrated circuit ("ASIC"), an FPGA, or other suitable processing device. The power allocation module 204 can instruct the processor 200 to receive KPIs 206 for each of the remote units 106a-f. In some aspects, the KPIs 206 may be received wirelessly from a telecommunications provider. In other aspects, the KPIs 206 may be received from the database 202. For example, KPIs 206 for the remote units 106a-f may have been previously provided by a telecommunications provider (e.g., during installation of the remote units 106a-f, during the initial configuration of the DAS 100, etc.) or previously calculated, estimated, or otherwise determined from known characteristics of the components or signals within the DAS 100 and/or the configuration of the DAS 100, and stored in the database 202.

The power allocation module 204 can also instruct the processor 200 to receive system factors 208. The system factors 208 may affect a KPI 206 for one or more of the remote units 106a-f. The system factors 208 received by the processor 200 may be received from a device or component (internal or external to the DAS 100) configured to determine the system factors 208, or like the KPIs 206, may be received from the database 202. For example, a system factor may be known or calculable based on known information about the system, including the number of channels in a path, antenna gain, etc. In some aspects, the processor 200 may be configured to determine the system factors 208, for example, by executed software from the power allocation module 204.

In some aspects, the power allocation module 204 can be configured to instruct the processor 200 to determine the RF power to be allocated to each of the remote units 106a-f in the DAS 100. For example, the power allocation module 204 can include programmable software that is executed by the processor 200. The determination and allocation of the RF power information can be based on information received by the processor 200. This information can include, for example, the KPIs 206 and the system factors 208. The power allocation module 204, in some aspects, may also be configured to enable the processor 200 to determine some or all of the system factors 208 used in the calculation of the RF power to the remote units 106a-f.

In some aspects, the processor 200 of the power allocation subsystem 110 may also be configured to receive KPIs 206 and system factors 208 via the functionality of a unit in which the power allocation subsystem 110 is located. In FIG. 2, the power allocation subsystem 110 is located in the head-end unit 104. The processor 200 may receive KPIs 206 and system factors 208 via the receiver 210 of the head-end unit 104. In some aspects, the processor 200 can also be configured to allocate RF power information via the functionality of a unit in which the power allocation subsystem 110 is located. For example, in FIG. 2, the processor can transmit information regarding the allocation of RF power to the remote units 106a-f using the transmitter 212 of the head-end unit 104. Although FIG. 2 depicts the power allocation subsystem 110 in the head-end unit 104, the subsystem may be located anywhere in the DAS 100 or may be functions of a unit within the DAS 100 without departing from the scope of the present disclosure.

Figure 3:
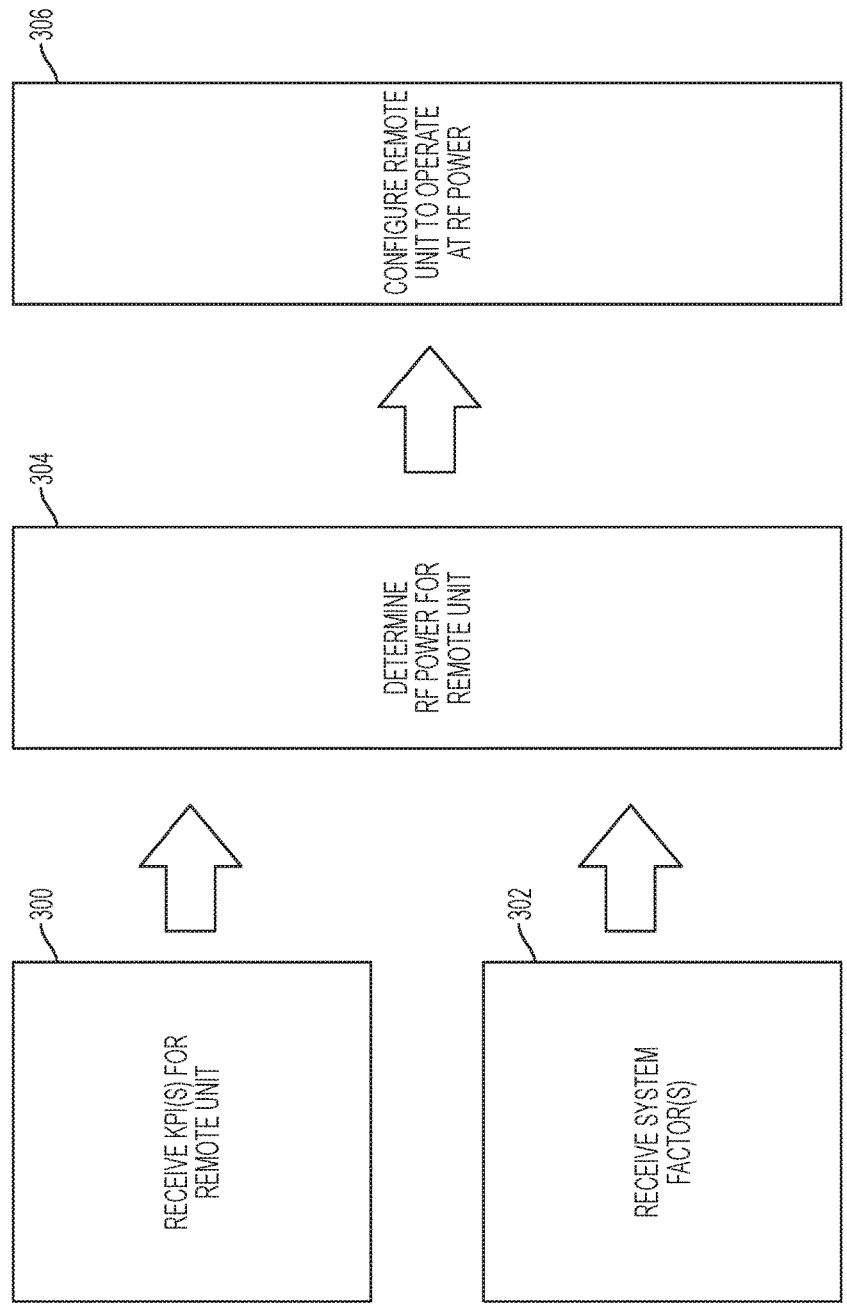
FIG. 3 is a block diagram depicting a power allocation subsystem according to an aspect of the present disclosure.

FIG. 3 illustrates an example of a process for allocating RF powers among remote units 106a-f in the DAS 100 based on KPIs 206. The process depicted in FIG. 3 is described with respect to one or more of the aspects and examples described above with respect to FIGS. 1 and 2. Other implementations, however, are possible.

At block 300, one or more KPIs 206 for one or more of the remote units 106a-f are received. The KPIs can be received by a processor 200 in a power allocation subsystem 110 directly or via a receiver of a unit in the DAS 100 (e.g., the receiver 210 of head-end unit 104), or by some other system or subsystem in a DAS 100 configured to allocate power to the remote units 106a-f. In some aspects, the KPI(s) 206 can be predetermined values based on known characteristics of a carrier signal. In other aspects, the KPI(s) can be provided or specified by the telecommunication providers. For example, when one or more of the remote units 106a-f is installed in the DAS 100, a telecommunication provider may specify a certain signal strength desired for each of the UE populating a coverage zone 108a, 108b, 108c serviced by the remote units 106a-f in the DAS 100. The KPIs 206, in some aspects, may be stored in a database 202 in a power allocation subsystem 110, or some other storage module in the DAS 100, and received from the database 202.

At block 302, one or more system factors 208 are received. As with KPIs 206, the system factors 208 can be received by a processor 200 in a power allocation subsystem 110 directly or via a receiver in a unit of the DAS 100 (e.g., the receiver 210 of the head-end unit 104), or by some other system or subsystem in the DAS 100 configured to allocate power to the remote units 106a-f in the DAS 100. In some aspects, the system factors 208 may be stored in a database 202, or some other storage module in the DAS 100, and received from the database 202. In other aspects, one or more of the system factors 208 may be received based on determinations performed by a processor 200. For example, the processor 200 may execute software from a power allocation module 204 to determine the path loss for one or more of the remote units 106a-f. The determined path loss may be stored in the database 202 or immediately received by the processor 200 for determining the RF power allocation for the remote units 106a-f, as explained below.

At block 304, an RF power for the remote unit may be determined. The determination is based on one or more received system factors 208 such that the RF power is sufficient to achieve one or more desired KPIs 206 that account for the applicable system factors 208. For example, one or more system factors 208 may affect one or more KPIs 206 by degrading or improving the RF power once it is received by one of more of the remote units 106a-f. The effect of a given system factor 208 on a given KPI 106 may depend on the frequency band of signals transmitted by a remote units 106a-f. For example, path loss can be a system factor 208.

In one example, a DAS 100 may be used to extend the coverage of both a Global System for Mobile Communications ("GSM") network and a Long-Term Evolution ("LTE") network. A given signal path in the DAS 100 may utilize both the GSM-1800 band and the LTE-2600 band. Sharing the GSM-1800 band and the LTE-2600 band in a path may involve a large difference in path loss between the bands. Due to the differences in path loss, less energy can be provided to the lower band signals (e.g., GSM-1800 signals) than the higher band signals (e.g., LTE-2600 signals) while still providing the same level of performance (or KPI 206) for all bands equally. For this reason the determination of RF power involves both the KPI(s) 206 and the system factors(s) 208.

At block 306, the remote units 106a-f may be configured to operate at the RF power determined for each of the remote units 106a-f. In some aspects, configuration of the remote units 106a-f can include transmitting RF power allocation information to the respective remote units 106a-f so that a sufficient RF power can be provided to the remote units 106a-f to meet the KPI(s) 206. For example, a processor 200 can be configured to transmit RF power information to the remote units 106a-f via a transmitter 212 in a head-end unit 104.

Figure 4:
FIG. 4 is a table depicting examples of criteria for distributing power in a telecommunications system according to an aspect of the present disclosure.

FIG. 4 is an example of a table 400 that may be used for distributing RF power in a DAS 100 based on KPI(s) 206. In some aspects, the values in the table 400 may be stored in a unit in the DAS 100 (e.g., in a database 202 of the power allocation subsystem 110) and may be accessible for determining RF power to one or more of the remote units 106a-f in the DAS 100.

Columns 402 and 404 list a number of different carriers and carrier frequency modulations, respectively. For example, the GSM 1800 band may include GSM, UMTS, and LTE 5 through 20 modulations, the UMTS 2100 band may include a UMTS modulation, and the LTE 2600 band may include LTE 5 through 20 modulations.

Column 406 represents the channel power, or RF power, to be used by applicable remote units 106a-f The value of a channel power or RF power is determined based on system factors 208, shown in columns 408, 410, 412. Here the system factors 208 include the number of channels (listed in column 408), path loss (listed in column 410), and antenna gain (listed in column 4 (listed in column 412). Column 414 lists a specified KPI for each carrier frequency modulation. The KPI may be unique to each carrier frequency modulation, common among a carrier, or any combination thereof. In FIG. 4, for example, "GSM1800 GSM" and "GSM1800 UMTS" are each associated with KPI of −80.0, while "GSM1800 LTE 5" may be associated with a KPI of −95.0. Column 416 represents the composite power, $P_{composite}$, of the channels in the given row. The composite power is a product of the channel power (in milliwatts) and the number of channels, converted to decibel-milliwatts (dBm). The following formula may be used to calculate the composite power in decibel-milliwatts:

$$P_{composite} = 10*\log [10\textasciicircum(P_{channel}/10)*N_{channel}],$$

where $P_{channel}$ is the channel power (column 406) and $N_{channel}$ is the number of channels (column 408). For example, for GSM1800 UMTS, the composite power of 5.4 dBm is 10*log [10^(0.6/10)*3].

In some aspects, certain system factors 208 can be based on determinations made by the power allocation subsystem 110 or based on known characteristics of the DAS 100. For example, the path loss listed in column 410 may be determined by using a reference path loss at a given frequency, measuring how the environment affects the reference path loss, and determining relative path loss for other frequencies based on a given formula. Also, the number of channels and the antenna gain, listed in columns 406 and 408, respectively, may be known characteristics of the DAS. System factors in addition to those shown may also be used without departing from the scope of the subject matter described herein.

A channel power (listed in column 406) may be determined based on the system factors listed in columns 408, 410, and 412 to achieve the KPI specified in column 414. The KPI is equal to the sum of the antenna gain and composite power, minus the path loss. In some aspects, the calculation may also be based on a reference power associated with the carrier modulation.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof can be apparent to those skilled in the art without departing from the scope of this invention. The illustrative examples described above are given to introduce the reader to the general subject matter discussed here and are not intended to limit the scope of the disclosed concepts.

What is claimed is:

1. A distributed antenna system, the system comprising:
   a head-end unit; and
   a plurality of remote units communicatively coupled to the head-end unit, the head-end unit obtaining one or more key performance indicators representative of a desired level of performance of at least one remote unit in the distributed antenna system, and the head-end unit obtaining one or more system factors representing measurements of the distributed antenna system that affect performance of the plurality of remote units at the desired level based on a configuration of the distributed antenna system;
   wherein the head-end unit determines a radio frequency power for the at least one remote unit to achieve the one or more key performance indicators based, at least in part, on the one or more system factors; and
   wherein the head-end unit configures the at least one remote unit to operate at the radio frequency power.

2. The system of claim 1, the head-end unit comprising a power allocation subsystem that executes code to determine the radio frequency power for the at least one remote unit to achieve the one or more key performance indicators based, at least in part, on the one or more system factors.

3. The system of claim 1, wherein to determine the radio frequency power for the at least one remote unit to achieve the one or more key performance indicators, the head-end unit determines a path loss for at least one carrier frequency modulation for the at least one remote unit.

4. The system of claim 1, wherein to determine the radio frequency power for the at least one remote unit to achieve the one or more key performance indicators, the head-end unit determines an antenna gain for at least one carrier frequency modulation for at least one remote unit.

5. The system of claim 1, the head-end unit comprising a receiver that receives the one or more key performance indicators and the one or more system factors.

6. The system of claim 1, the head-end unit further comprising a transmitter for transmitting radio frequency power information to the at least one remote unit, the radio frequency power information representing the radio frequency power.

7. The system of claim 1, wherein the at least one remote unit transmits and receives using more than one frequency band.

8. The system of claim 1, the head-end unit further comprising a database stored on a non-transitory computer-readable medium;
   wherein the head-end unit obtains the one or more system factors from the database.

9. The system of claim 1, wherein at least one of the one or more key performance indicators is representative of a signal strength of the at least one remote unit.

10. The system of claim 1, the head-end unit further comprising a database stored on a non-transitory computer-readable medium;
    wherein the one or more key performance indicators are specified by a telecommunications provider using the distributed antenna system and read by the head-end unit from the database.

11. The system of claim 1, wherein the head-end unit determines the radio frequency power at least in part on a reference power, the reference power determined from characteristics of a carrier signal associated with the one or more key performance indicators.

* * * * *